Patented Sept. 28, 1954

2,690,438

UNITED STATES PATENT OFFICE 2,690,438

AZO-DYESTUFFS

Herbert Kracker, Frankfurt am Main Hochst, Germany, assignor to Farbwerke Hoechst Aktiengesellschaft vormals Meister Lucius und Brüning, Frankfurt am Main Hochst, Germany, a company of Germany No Drawing. Application October 10, 1951, Serial No. 250,799

Claims priority, application Germany October 18, 1950

4 Claims. (Cl. 260—187)

The present invention relates to new azo-dyestuffs. It is based on the observation that 4-amino-2-hydroxybenzene-1-carboxylic acid and the derivatives thereof corresponding to the general formula

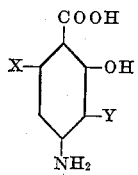

wherein X and Y stand for hydrogen or any substituent, may be used with advantage as diazo-components for the manufacture of valuable azo-dyestuffs. By coupling these diazo-compounds with any azo-components, as for instance salicylic acid, naphthol-sulfonic acids, aminonaphthol-sulfonic acids, pyrazolones, resorcin or the like, dyestuffs are obtained corresponding to the general formula

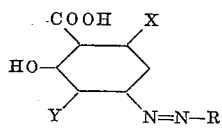

wherein X and Y have the meaning indicated above and R stands for the radical of an azo-component capable of being combined with diazo-compounds to form azo-dyestuffs. If the radical R contains an amino-group capable of being diazotized, the monoazo-dyestuffs formed can be further diazotized and coupled again with any azo-component.

Since the new dyestuffs contain the salicylic acid grouping, they can be after-treated on the fiber or in substance with compounds yielding metal, particularly with chromium salts. The metal complex compounds thus formed considerably improve the fastness properties of the dyestuffs. The orange to black dyeings produced by the after-treatment are distinguished by good general fastness properties. With particular advantage the new dyestuffs can also be applied to the fiber directly in the form of their chromium complex compounds according to the so-called meta-chrome process.

The following examples serve to illustrate the invention, but they are not intended to limit it thereto, the parts being by weight, unless otherwise stated:

Example 1

153 parts of 4-amino-2-hydroxybenzene-1-carboxylic acid are dissolved in 40 parts of caustic soda and 500 parts of water. 69 parts of sodium nitrite are then added. The solution thus obtained is caused to run into a mixture of ice and 280 parts of hydrochloric acid of 24° Bé. The suspension of the diazo-compound is then introduced into a solution of 140 parts of 1-hydroxybenzene-2-carboxylic acid in 40 parts of caustic soda and 1000 parts of water to which 250 parts of calcined sodium carbonate have been added. After stirring for several hours the formation of the dyestuff is finished. The dyestuff is salted out with sodium chloride and after filtering with suction and drying it is obtained in the form of a brown-yellow powder. It dyes wool yellow-brown shades which, when after-treated with potassium bichromate and sulfuric acid, turn into medium brown shades of good fastness properties. The dyestuff corresponds to the following formula

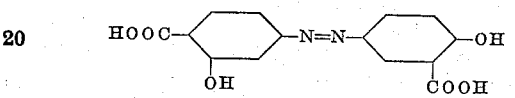

Dyeings of the same good properties are obtained by applying the dyestuff to the fiber directly as chromium complex compound from a bath containing ammonium-sulfate and potassium chromate according to the meta-chrome process.

In the following table further dyestuffs are described in which the amino-salicylic acid is used as diazo-component and which may be obtained in a manner similar to that described in the preceding example.

| Diazo-Component | Azo-Component | Shade of the after-chromed dyeing |
|---|---|---|
| 1. 4-amino-2-hydroxybenzene-1-carboxylic acid. | 4-amino-2-hydroxybenzene-1-carboxylic acid. | reddish brown. |
| 2. 4-amino-2-hydroxybenzene-1-carboxylic acid. | 1-hydroxy-naphthalene-5-sulfonic acid. | violetish brown. |
| 3. 4-amino-2-hydroxybenzene-1-carboxylic acid. | 2-hydroxy-naphthalene-6-sulfonic acid. | reddish brown. |
| 4. 4-amino-6-methyl-2-hydroxybenzene-1-carboxylic acid. | 2-hydroxy-6-methyl-benzene-1-carboxylic acid. | medium brown. |
| 5. 4-amino-3-chloro-2-hydroxybenzene-1-carboxylic acid. | 1-hydroxy-naphthalene-4-sulfonic acid. | brown-violet. |
| 6. 4-amino-3-methyl-6-chloro-2-hydroxy-benzene-1-carboxylic acid. | 2-hydroxy-naphthalene-7-sulfonic acid. | medium brown. |
| 7. 4-amino-3,6-dimethyl-2-hydroxybenzene-1-carboxylic acid. | 1,3-dihydroxy-benzene. | yellowish brown. |
| 8. 4-amino-3,6-dichloro-2-hydroxybenzene-1-carboxylic acid. | 1-(4'-sulfophenyl)-3-methyl-5-pyrazolone. | reddish yellow. |

Example 2

153 parts of 4-amino-2-hydroxybenzene-1-carboxylic acid are diazotized as described in Example 1. The suspension of the diazo-compound is caused to run into a suspension of 1-amino-naphthalene which is obtained as follows: 143 parts of 1-amino-naphthalene are dissolved at boiling temperature in 200 parts by volume of a 5 N-hydrochloric acid and 1000 parts of water and the solution is poured on ice. After stirring for 4 hours 300 parts of crystallized sodium acetate are added to the mixture of the diazo-compound and the 1-amino-naphthalene, stirring is continued for further 4 hours and the dyestuff formed is filtered with suction.

It is dissolved in 40 parts of caustic soda and 3000 parts of water, the solution is filtered and mixed with 69 parts of sodium nitrite. The solution thus obtained is caused to run at a temperature between 5° C. and 10° C. into 280 parts of hydrochloric acid of 24° Bé. The diazo-solution obtained is then introduced into a solution of 345 parts of a 1-hydroxynaphthalene-4-sulfonic acid of 71.4 per cent. strength in 40 parts of caustic soda and 1000 parts of water, to which 530 parts of calcined sodium carbonate have been added. As soon as the coupling reaction is finished, the disazo-dyestuff formed is completely salted out, filtered with suction and thoroughly washed with sodium chloride solution. After drying it is obtained in the form of a dark powder. It dyes wool from an acid bath dull claret-red shades which, when after-treated with potassium bichromate and sulfuric acid, turn into reddish navy-blue shades of good fastness properties, especially of a good fastness to washing.

Similar dyestuffs are obtained by using, instead of 1-amino-naphthalene, for instance 1-amino-3-methylbenzene, 1-aminonaphthalene-6- or -7-sulfonic acid, 1-amino-2,5-dimethylbenzene, 1-amino-2,5-dimethoxybenzene, 1-amino-2,5-diethoxybenzene or 3-amino-4-methoxy-1-methylbenzene, and instead of 1-hydroxynaphthalene-4-sulfonic acid, for instance 1-hydroxynaphthalene-5-sulfonic acid, 2-hydroxynaphthalene-6-sulfonic acid, 1-hydroxynaphthalene-3,6-disulfonic acid, 2-hydroxynaphthalene-3,6-disulfonic acid, 2- or 1-hydroxynaphthalene, 1-phenyl-3-methyl-5-pyrazolone, 1,3-dihydroxybenzene and the like.

I claim:

1. The azo-dyestuffs corresponding to the following general formula

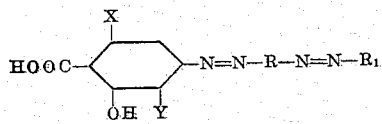

wherein R and R1 each represent a member selected from the group which consists of radicals of the benzene, naphthalene and pyrazolone series, the azo groups standing in one of the positions ortho and para to each other, X and Y each represent a member selected from the group which consists of hydrogen, methyl and chlorine, and wherein the radicals R and R1 contain at least one group which imparts water-solubility to said azo-dyestuff.

2. The azo-dyestuffs corresponding to the following general formula

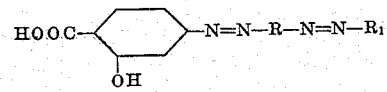

wherein R and R1 each represent a member selected from the group which consists of radicals of the benzene, naphthalene and pyrazolone series, the azo groups standing in one of the positions ortho and para to each other, which contain at least one group which imparts water-solubility to said azo dyestuff.

3. The azo-dyestuff corresponding to the following formula

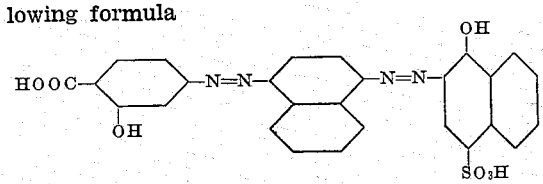

dyeing wool from an acid bath dull claret-red shades which when after-chromed turn into reddish navy-blue shades of good fastness properties, especially good fastness to washing.

4. The azo-dyestuff corresponding to the following formula

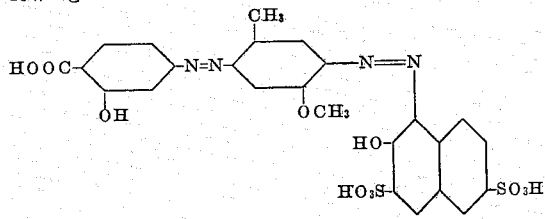

dyeing wool from an acid bath claret-red shades which when after-chromed turn into reddish navy-blue shades of good fastness properties.

References Cited in the file of this patent

UNITED STATES PATENTS

| Number | Name | Date |
| --- | --- | --- |
| 438,438 | Lauch et al. | Oct. 14, 1890 |
| 1,157,169 | Mettler | Oct. 19, 1915 |
| 1,848,650 | Ostertag | Mar. 8, 1932 |